(12) United States Patent
Subramanian et al.

(10) Patent No.: US 9,886,387 B2
(45) Date of Patent: Feb. 6, 2018

(54) METHOD AND SYSTEM FOR PERFORMING ON-DEMAND DATA WRITE THROUGH BASED ON VIRTUAL MACHINE TYPES

(71) Applicant: AMERICAN MEGATRENDS, INC., Norcross, GA (US)

(72) Inventors: Lokeshraj Subramanian, Chennai (IN); Santhosh Samuel Mathews, Chennai (IN); Varadachari Sudan Ayanam, Suwanee, GA (US); Jayachandran Gnanasekaran, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 127 days.

(21) Appl. No.: 14/610,262

(22) Filed: Jan. 30, 2015

(65) Prior Publication Data

US 2016/0224358 A1    Aug. 4, 2016

(51) Int. Cl.

| | |
|---|---|
| G06F 12/0868 | (2016.01) |
| G06F 9/455 | (2006.01) |
| G06F 9/50 | (2006.01) |
| G06F 9/44 | (2006.01) |

(52) U.S. Cl.
CPC ........ *G06F 12/0868* (2013.01); *G06F 9/4445* (2013.01); *G06F 9/45533* (2013.01); *G06F 9/45558* (2013.01); *G06F 9/5016* (2013.01); *G06F 2009/45583* (2013.01)

(58) Field of Classification Search
CPC .. G06F 9/45533; G06F 9/4558; G06F 9/5016; G06F 9/45558; G06F 2009/45583; G06F 1/3203; G06F 9/4445; G06F 12/0868
See application file for complete search history.

(56) References Cited

U.S. PATENT DOCUMENTS

| | | | |
|---|---|---|---|
| 6,523,095 B1 | 2/2003 | Breternitz | |
| 2010/0023940 A1 | 1/2010 | Iwamatsu et al. | |
| 2012/0137289 A1 | 5/2012 | Nolterieke et al. | |
| 2013/0097458 A1 | 4/2013 | Sekino et al. | |
| 2013/0111474 A1 | 5/2013 | Kgarwal et al. | |
| 2014/0068183 A1* | 3/2014 | Joshi | G06F 12/0866 711/114 |
| 2014/0173591 A1* | 6/2014 | Lin | G06F 9/45533 718/1 |

(Continued)

*Primary Examiner* — Lewis A Bullock, Jr.
*Assistant Examiner* — Jacob D Dascomb
(74) *Attorney, Agent, or Firm* — Locke Lord LLP; Tim Tingkang Xia, Esq.

(57) ABSTRACT

Certain aspects of the present disclosure relates to a system having a virtual desktop server (VDS). In operation, the VDS is configured to: create a random access memory (RAM) disk in a memory; partition the RAM disk into a two partitions, one for caching first data received from instances of pooled virtual machines (VMs), and the other for caching second data received from personalized VMs; create a data store in a storage device, including two portions for preserving the first data and the second data respectively; and perform a plurality of data write through operations based on VM types. The write through cache operations may include: disabling data write through for the first data; and enabling the data write through for the second data.

17 Claims, 5 Drawing Sheets

(56) References Cited

U.S. PATENT DOCUMENTS

| | | | |
|---|---|---|---|
| 2015/0033229 A1* | 1/2015 | Tegtmeier | H04L 41/145 718/1 |
| 2015/0142908 A1* | 5/2015 | Sun | G06F 9/455 709/213 |
| 2015/0378921 A1* | 12/2015 | Karippara | G06F 9/45533 710/308 |
| 2016/0092255 A1* | 3/2016 | Bernal | G06F 9/45558 718/1 |
| 2016/0103613 A1* | 4/2016 | Oshins | G06F 3/064 711/170 |

* cited by examiner

METHOD AND SYSTEM FOR PERFORMING ON-DEMAND DATA WRITE THROUGH BASED ON VIRTUAL MACHINE TYPES

FIELD

The present disclosure relates generally to virtual desktop infrastructure (VDI) technology, and more particularly to systems and methods of performing on-demand data write through in a VDI system using a random access memory (RAM) disk based on virtual machine types.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A RAM disk is a block of volatile random access memory that computer software is treating as if the memory is a disk drive (non-volatile storage space). The performance of a RAM disk is in general much faster than other forms of storage media, such as a solid state drive (SSD), hard drive (HD), or optical drive (CD or DVD drives). The performance gain is due to access time, maximum throughput, and type of file systems, among other things. The RAM disk is used as if it is a non-volatile storage device to store persistent data. Cache is often used in connection to the RAM disk. A copy of data temporarily is stored in rapidly-accessible storage media such as memory local to the processor or central processing unit (CPU) such that when this data is accessed by the processor, the processor can retrieve the data from the local memory instead of non-volatile storage devices such as the SSDs, the HDs, CD or DVD drives. In virtual desktop infrastructure, the RAM disks are frequently used to store data from various virtual machines running on a virtual desktop server. In certain applications, the RAM disk is used with write through cache to store temporary data indiscriminately, and certain data may not need to be stored in the RAM disk.

Therefore, an unaddressed need exists in the art to address the aforementioned deficiencies and inadequacies.

SUMMARY

In one aspect, the present disclosure relates to a system of performing on-demand data write through operations. In certain embodiments, the system includes a virtual desktop server, which includes a processor, a memory, and a storage device storing computer executable code. When the computer executable code is executed at the processor, the computer executable code is configured to: allocate a portion of the memory to create a random access memory (RAM) disk; partition the RAM disk into a first partition for caching first data received from a plurality of first type virtual machines (VMs), and a second partition for caching second data received from a plurality of second type VMs; allocate a portion of the storage device to create a data store, where the data store includes a first portion for preserving the first data received from the first type VMs, and a second portion for preserving the second data received from the second type VMs; and perform a plurality of data write through operations based on VM types. The data write through operations include: disabling data write through for the first data from the first partition of the RAM disk to the first portion of the data store; and enabling the data write through for the second data from the second partition of the RAM disk to the second portion of the data store.

In certain embodiments, the storage device further stores a hypervisor and a persistent copy of each of the first type VMs and the second type VMs. In certain embodiments, the virtual desktop server is configured to execute the hypervisor, copy the first type VMs and the second type VMs from the corresponding persistent copy to the RAM disk, and execute each of the first type VMs and the second type VMs at the RAM disk on the executed hypervisor. Each of the executed first type and second type VMs is configured to provide one or more virtual desktops accessible for a plurality of computing devices functioning as a plurality of thin clients.

In certain embodiments, each of the first data received from the first type VMs and the second data received from the second type VMs includes one or more input/output (I/O) request packets (IRPs).

In certain embodiments, each of the first type VMs is a shared instance of a pooled VM, and each of the second type VMs is a personalized VM assigned to a specific user.

In certain embodiments, the data write through operations further include: in response to receiving the first data from the first type VMs, determining whether the first data is related to a virtual machine management task; and when the first data is related to the virtual machine management task, enabling the data write through for the first data from the first partition of the RAM disk to the first portion of the data store. In certain embodiments, the data write through operations further include: when the first data is unrelated to the virtual machine management task, disabling the data write through for the first data from the first partition of the RAM disk to the first portion of the data store.

In certain embodiments, the computer executable code includes: a receiving module configured to receive data from the first type VMs and the second type of VMs; a determination module configured to determine a corresponding write through operation for each of the received data; a write through module configured to perform the data write through operations for the received data; and a management module configured to create the data store, create the RAM disk, partition the RAM disk, partition the data store into the first portion and the second portion, and control the write through module to enable or disable the data write through for the received data based on determination of the determination module for the received data.

In certain embodiments, the determination module is configured to determine the corresponding write through operation for each of the received data by: determining whether the received data is the first data from the first type VMs or the second data from the second type VMs; and when the received data is the first data, determining whether the first data is related to the virtual machine management task.

In certain embodiments, the write through module is configured to perform the data write through operations by: storing the first data in the first partition of the RAM disk when the data write through is disabled for the first data; storing the first data in the first partition of the RAM disk and in the first portion of the data store when the data write through is enabled for the first data; and storing the second data in the second partition of the RAM disk and in the second portion of the data store.

In certain embodiments, the management module is configured to control the write through module to enable or disable the data write through for the received data by: when the received data is the second data, controlling the write through module to enable the data write through for the second data; when the received data is the first data and is related to the virtual machine management task, controlling the write through module to enable the data write through for the first data related to the virtual machine management task; and when the received data is the first data and is unrelated to the virtual machine management task, controlling the write through module to disable the data write through for the first data unrelated to the virtual machine management task.

In another aspect, the present disclosure relates to a method for performing on-demand data write through operations. In certain embodiments, the method includes: allocating, at a virtual desktop server, a portion of the memory to create a random access memory (RAM) disk; partitioning, at the virtual desktop server, the RAM disk into a first partition for caching first data received from a plurality of first type virtual machines (VMs), and a second partition for caching second data received from a plurality of second type VMs; allocating, at the virtual desktop server, a portion of the storage device to create a data store, wherein the data store comprises a first portion for preserving the first data received from the first type VMs, and a second portion for preserving the second data received from the second type VMs; and performing, at the virtual desktop server, a plurality of data write through operations based on VM types. The data write through operations include: disabling data write through for the first data from the first partition of the RAM disk to the first portion of the data store; and enabling the data write through for the second data from the second partition of the RAM disk to the second portion of the data store.

In certain embodiments, each of the first data received from the first type VMs and the second data received from the second type VMs comprises one or more IRPs.

In certain embodiments, each of the first type VMs is a shared instance of a pooled VM, and each of the second type VMs is a personalized VM assigned to a specific user.

In certain embodiments, the data write through operations further includes: in response to receiving the first data from the first type VMs, determining whether the first data is related to a virtual machine management task; when the first data is related to the virtual machine management task, enabling the data write through for the first data from the first partition of the RAM disk to the first portion of the data store; and when the first data is unrelated to the virtual machine management task, disabling the data write through for the first data from the first partition of the RAM disk to the first portion of the data store.

In certain embodiments, the method further includes: determining a corresponding write through operation for each of the received first data and second data. In certain embodiments, the corresponding write through operation for each of the received first data and second data is determined by: determining whether the received data is the first data from the first type VMs or the second data from the second type VMs; and when the received data is the first data, determining whether the first data is related to the virtual machine management task.

In certain embodiments, the data write through operations are performed by: storing the first data in the first partition of the RAM disk when the data write through is disabled for the first data; storing the first data in the first partition of the RAM disk and in the first portion of the data store when the data write through is enabled for the first data; and storing the second data in the second partition of the RAM disk and in the second portion of the data store.

A further aspect of the present disclosure relates to a non-transitory computer readable medium storing computer executable code. When the computer executable code is executed at a processor of a virtual desktop server, the computer executable code is configured to: allocate a portion of a memory of the virtual desktop server to create a random access memory (RAM) disk; partition the RAM disk into a first partition for caching first data received from a plurality of first type virtual machines (VMs), and a second partition for caching second data received from a plurality of second type VMs; allocate a portion of a storage device of the virtual desktop server to create a data store, wherein the data store comprises a first portion for preserving the first data received from the first type VMs, and a second portion for preserving the second data received from the second type VMs; and perform a plurality of data write through operations based on VM types. The data write through operations include: disabling data write through for the first data from the first partition of the RAM disk to the first portion of the data store; and enabling the data write through for the second data from the second partition of the RAM disk to the second portion of the data store.

In certain embodiments, each of the first data received from the first type VMs and the second data received from the second type VMs comprises one or more IRPs.

In certain embodiments, each of the first type VMs is a shared instance of a pooled VM, and each of the second type VMs is a personalized VM assigned to a specific user.

In certain embodiments, the data write through operations further includes: in response to receiving the first data from the first type VMs, determining whether the first data is related to a virtual machine management task; when the first data is related to the virtual machine management task, enabling the data write through for the first data from the first partition of the RAM disk to the first portion of the data store; and when the first data is unrelated to the virtual machine management task, disabling the data write through for the first data from the first partition of the RAM disk to the first portion of the data store.

In certain embodiments, the computer executable code stored in the non-transitory computer readable medium includes: a receiving module configured to receive data from the first type VMs and the second type of VMs; a determination module configured to determine a corresponding write through operation for each of the received data; a write through module configured to perform the data write through operations for the received data; and a management module configured to create the data store, create the RAM disk, partition the RAM disk, partition the data store into the first portion and the second portion, and control the write through module to enable or disable the data write through for the received data based on determination of the determination module for the received data.

In certain embodiments, the determination module is configured to determine the corresponding write through operation for each of the received data by: determining whether the received data is the first data from the first type VMs or the second data from the second type VMs; and when the received data is the first data, determining whether the first data is related to the virtual machine management task.

In certain embodiments, the write through module is configured to perform the data write through operations by: storing the first data in the first partition of the RAM disk when the data write through is disabled for the first data;

storing the first data in the first partition of the RAM disk and in the first portion of the data store when the data write through is enabled for the first data; and storing the second data in the second partition of the RAM disk and in the second portion of the data store.

In certain embodiments, the management module is configured to control the write through module to enable or disable the data write through for the received data by: when the received data is the second data, controlling the write through module to enable the data write through for the second data; when the received data is the first data and is related to the virtual machine management task, controlling the write through module to enable the data write through for the first data related to the virtual machine management task; and when the received data is the first data and is unrelated to the virtual machine management task, controlling the write through module to disable the data write through for the first data unrelated to the virtual machine management task.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-5. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
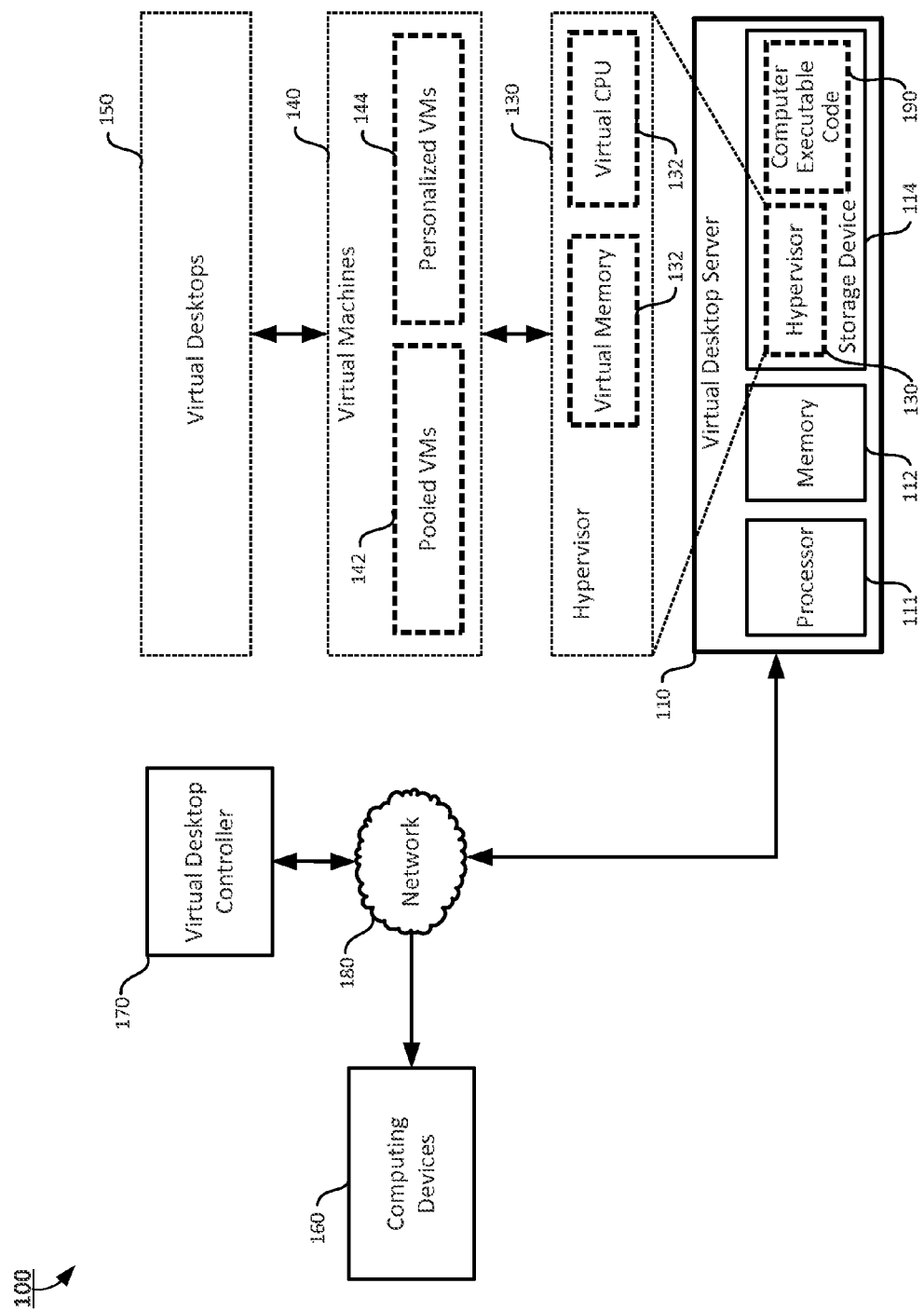
FIG. 1 schematically depicts an exemplary virtual desktop infrastructure (VDI) system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "launch a virtual machine", as used herein, generally refers to a process of instantiating or constructing a new virtual machine instance with a specific virtual machine ID on a hypervisor. Once the virtual machine is launched, the virtual machine in an "on" state. The term "shutting down a virtual machine", as used herein, generally refers to a process of deleting or destructing an existing virtual machine instance with a specific virtual machine ID on a hypervisor. Once the virtual machine is destructed, the virtual machine is in an "off" state.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-5, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In accordance with the purposes of present disclosure, as embodied and broadly described herein, in certain aspects, the present disclosure relates to a virtual desktop infrastructure (VDI) system 100. FIG. 1 schematically depicts an exemplary VDI system according to certain embodiments of the present disclosure. As shown in FIG. 1, the system 100 includes: a virtual desktop server 110, one or more computing devices 160, a virtual desktop controller 170, and a network 180. The virtual desktop server 110, the computing devices 160, and the virtual desktop controller 170 are communicatively interconnected by the network 180. The network 180 may be a wired or wireless network, and may be of various forms, such as a public network and a private network. Examples of the network 180 may include, but not limited to, a local area network (LAN) or wide area network (WAN) including the Internet. In certain embodiments, two or more different networks 180 may be applied to connect the virtual desktop server 110, an UPS, the computing devices 160, and the virtual desktop controller 170.

The virtual desktop server 110 is a computing device which serves as a server for providing virtual machine services for the virtual desktop system 100. In certain embodiments, the virtual desktop server 110 may include necessary hardware and software components to perform certain predetermined tasks. For example, as shown in FIG. 1, the virtual desktop server 110 includes a processor 111, a memory 112, and a storage device 114. Further, the virtual desktop server 110 may include other hardware components and software components (not shown) to perform its corresponding tasks. Examples of these hardware and software components may include, but not limited to, other required memory, interfaces, buses, Input/Output (I/O) modules and peripheral devices.

The processor 111 is a host processor which is configured to control operation of the virtual desktop server 110. The processor 111 can execute the hypervisor 130 and the computer executable code 190 stored in the storage device 114, as well as other applications of the virtual desktop server 110. In certain embodiments, the processor 111 may be a central processing unit (CPU). In certain embodiments, the virtual desktop server 110 may run on more than one CPU as the host processor, such as two CPUs, four CPUs, eight CPUs, or any suitable number of CPUs.

The memory 112 can be a volatile memory, such as the random-access memory (RAM), for storing the data and information during the operation of the virtual desktop server 110.

The storage device 114 can be a non-volatile data storage media for storing a hypervisor 130, computer executable code 190, and other applications of the virtual desktop server 110. Examples of the storage device 114 may include flash memory, memory cards, USB drives, hard drives, floppy disks, optical drives, or any other types of suitable non-volatile data storage devices. The storage device access time varies widely among these storage devices listed here. For example, the flash memory, the memory cards, the USB drives are much faster than the hard drives, the floppy disks, and the optical drives, often in the ten, hundreds or thousands time. A typical hard drive is capable of up to 80-100 MB/s throughput when new. On the other hand, a one terabyte (TB) flash SSD using a PCI Express ×8 interface, achieved a maximum write speed of 654 megabytes per second (MB/s) and maximum read speed of 712 MB/s.

Figure 2:
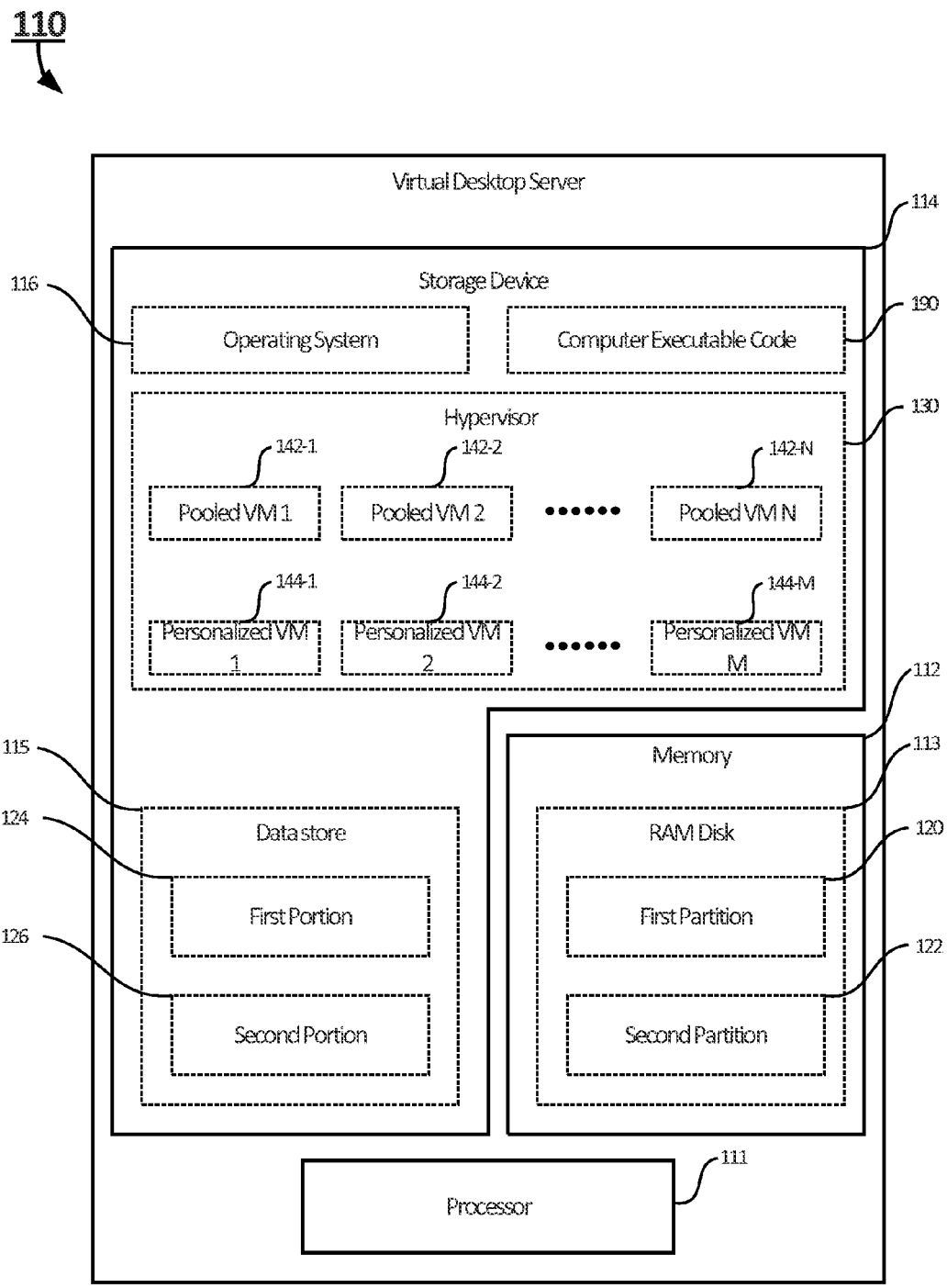
FIG. 2 schematically depicts the virtual desktop server according to certain embodiments of the present disclosure.

FIG. 2 schematically depicts the virtual desktop server according to certain embodiments of the present disclosure. Specifically, as shown in FIGS. 1 and 2, the virtual desktop server 110 includes the processor 111, the memory 112, and the storage device 114. The storage device 114 stores an operating system (OS) 116, computer executable code 190, the hypervisor 130 and a plurality of VMs 140. Specifically, the storage device 114 stores a persistent copy of each of the VMs 140.

The hypervisor 130 is a program that allows multiple virtual machine (VM) instances 140 to run simultaneously and share a single hardware host, such as the virtual desktop server 110. The hypervisor 130, when executed at the processor 111 or any other processor, implements hardware virtualization techniques and allows one or more operating systems or other applications to run concurrently as guests of one or more virtual machines 140 on the virtual desktop server 110. The hypervisor 130 allows each user to run an operating system instance as a virtual machine. In certain embodiments, the hypervisor 130 can be of various types and designs, such as MICROSOFT HYPER-V, XEN, VMWARE ESX, or other types of hypervisors.

Referring back to FIG. 1, in certain embodiments, the virtual desktop server 110 is configured to execute the hypervisor 130, copy each of the VMs 140 from the corresponding persistent copy to a RAM disk, and execute the VMs 140 at the RAM disk on the executed hypervisor 130. Details of the RAM disk will be described later. When the hypervisor instance 130 runs on the virtual desktop server 110, the hypervisor 130 emulates a virtual computer machine, including a virtual CPU 132 and a virtual memory 134 as shown in FIG. 1. A plurality of VMs 140 can operate in the hypervisor 130. Each VM 140 can run a virtual machine operation system (VMOS), such as WINDOWS or LINUX. For brevity, unless otherwise noted, the VM and the VMOS run in that VM are collectively referred to as a VM.

In certain embodiments, the VMs 140 include two types: the first type VMs are referred to as pooled VMs 142, and the second type VMs are referred to as personalized VMs 144. A pooled VM is a master VM, which may generate multiple shared copies or instances to be shared by a group of users, such that any one of the users in the group may access an instance of the pooled VM. In comparison, a personalized VM is only assignable to a specific user and not shared by anyone else. In other words, instances of pooled VMs may be shared by a group of users without having specific assignments, while a personalized VM is assigned to a specific user.

In certain embodiments, when the pooled VMs 142 are executed on the hypervisor 130, N instances of pooled VMs 142 may be provided, which include a first instance 142-1, a second instance 142-2, . . . and a N-th instance 142-N, where N is a positive integer. In certain embodiments, when the personalized VMs 144 are executed on the hypervisor 130, M instances of personalized VMs 144 may be provided, which include a first instance 144-1, a second instance 144-2, . . . and a M-th instance 144-M, where M is a positive integer, with each instance of the personalized VMs 144 assigned to a specific user. The number M of the instances of the personalized VMs 144 is independent from, and may not necessarily be the same as, the number N of the instances of the pooled VMs 142. In certain embodiments, one or more virtual desktops 150 (collectively shown in FIG. 1) may be operating on each of the virtual machines 140. In certain embodiments, the virtual desktops 150 include L virtual desktops 150, where L is a positive integer. In one embodiment, each of the virtual desktops 150 is running on a corresponding instance of VM 140 (which may be a pooled VM 142 or a personalized VM 144). In this case, the number L of the virtual desktops 150 is equal to the sum of the numbers M and N. In another embodiment, each of the virtual desktops 150 runs on one or more instances of VMs 140. In this case, the number L of the virtual desktops 150 may be different from the sum of the numbers M and N.

Each of the computing devices 160 functions as a thin client, which is operated by various users to access one of the virtual desktops 150. In certain embodiments, each of the computing devices 160 is in communication with the virtual desktop controller 170 through the network 180. The computing devices 160 (not individually shown in FIG. 2) includes a first computing device 160-1, a second computing device 160-2, . . . , and a k-th computing device 160-K, where K is a positive integer. In other words, the number of the computing devices 160 is K. In certain embodiments, the number K of the computing devices 160 may be equal to the number L of the virtual desktops 150 and/or the total number (M+N) of the virtual machines 140, or may be different from the number L of the virtual desktops 150 and/or the total number (M+N) of the virtual machines 140.

In certain embodiments, the computing devices 160 function as thin clients. Each of the computing devices 160 can be: a desktop computer, a laptop computer, a netbook computer, a notebook computer, a tablet computer, a smart mobile phone and/or other network connected terminal devices.

The virtual desktop controller 170 is a controller to control and manage the operation of the virtual desktops 150 and the virtual machines 140 of the virtual desktop system 100. As described above, the virtual machines 140 provides the virtual desktops 150 to various user devices operated by various users. The virtual desktop controller 170 allows an administrator of the virtual desktop system 100 to set up, administer, and manage the virtual desktops 150 and the virtual machines 140 of the system 100.

In certain embodiments, when the VMs 140 are operating on the hypervisor 130, the virtual machines 140 constantly exchange data with the processor 111 in the memory 112. The data exchanged can be divided into two types: a temporary type, and a persistent type. The temporary data need only to be stored in the memory 112, and the persistent data need to be stored in the non-volatile storage device 114. In certain embodiments, write through cache is used to speed up the data access/exchange. Write through is a storage method in which persistent data is written into a cache in the memory 112, and the corresponding non-volatile storage device 114 at the same time. The cached data allows for fast retrieval on demand, while the same data in the non-volatile storage device 114 ensures that nothing will get lost if a power failure occurs.

In order to improve the throughput of data input and output, a cache such as a RAM disk is used to decrease the memory access time. When certain data needs to be stored in the non-volatile storage, the data is first stored in the RAM disk, and then an identical copy of the data cached in the RAM disk is stored in the non-volatile storage device. The processor 111 accesses only the data in the RAM disk, instead of accessing the non-volatile storage device 114 such as a hard drive, a solid state drive, or other non-volatile storage devices. The access to the non-volatile storage device 114 takes significantly longer time. Therefore, using the RAM disk saves time, and precious resources of the virtual desktop server 110.

Referring to FIG. 2, in certain embodiments, a portion of the memory 112 is allocated to form a RAM disk 113, and a portion of the non-volatile storage device 114 is allocated to form a data store 115. At certain time, the data in the RAM disk 113 is written to the data store of the non-volatile storage device 114 as permanent records. On the other hand, the memory 112, which is volatile, requires power to maintain information stored in the memory 112. It retains its contents while powered, and if the power to the virtual desktop server 110 is interrupted, the information stored is immediately lost. In order to make RAM disk 113 a non-volatile storage device, certain measures must be taken to ensure the memory 112 is constantly powered. For example, the virtual desktop server 110 may be powered by an UPS.

In certain embodiments, the processor 111 exchanges data for each of the VMs 140 (which include the pooled VMs 142 and the personalized VMs 144) constantly. Certain data exchanged need to be preserved in the data store 115 of the non-volatile storage device 114 such that the data may be preserved, and certain data may be only stored in the RAM disk 113 or in a cache of the memory 112 during the operation of the virtual desktop server 110. In certain embodiments, the data exchanged include certain input/output (I/O) request packets (IRPs). The IRPs are kernel mode structures that are used by the device drivers to communicate with each other and with an operating system of the virtual desktop server 110. They are data structures that describe I/O requests. Rather than passing a large number of small arguments (such as buffer address, buffer size, I/O function type, etc.) to a driver, all of these parameters are passed via a single pointer to this persistent data structure. The IRP with all of its parameters can be put on a queue if the I/O request cannot be performed immediately.

Certain IRPs contains certain important information and these IRPs are to be preserved in the non-volatile storage device 114 such that this important information will not be lost if an electric power supply to the virtual desktop server 110 is interrupted. This important information usually involve various virtual machine management tasks, such as create one or more virtual machines, create one or more virtual disks, create virtual network, run power management tasks on virtual machines, create snapshot of a virtual machine, revert snapshot of a virtual machine, delete a snapshot of a virtual machine, delete one or more virtual machines, delete one or more virtual disks, delete virtual network, and view virtual machine management reports etc. The information related to the operation of the virtual machines such as the current status of one or more virtual machines, virtual desktops, and virtual disks, is too important to loss in case of a power failure. Therefore, certain IRPs containing one or more of the virtual machine management tasks must be preserved in the non-volatile storage device 114.

In order to improve the throughput of data input and output, a cache and a RAM disk are used to decrease the memory access time. When certain data needs to be stored in the non-volatile storage, the data is first cached in the cache, and then an identical copy of the data cached is written through to the RAM disk and finally written to the non-volatile storage. Therefore, the processor 111 accesses only the data in the cache and the RAM disk, instead of accessing the non-volatile storage device 114 such as a hard drive, a solid state drive, or other non-volatile storage devices.

In certain embodiments, as shown in FIG. 2, the RAM disk 113 is partitioned into two partitions, including a first partition 120 for caching first data received from the pooled VMs 142, and a second partition 122 for caching second data received from the personalized VMs 144. Further, the data store 115 may also be partitioned to include two portions, which includes a first portion 124 for preserving the first data received from the pooled VMs 142, and a second portion 126 for preserving the second data received from the personalized VMs 144. In other words, the first partition 120 of the RAM disk 113 and the first portion 124 of the data store 115 correspond to the first data received from the pooled VMs 142, and the second partition 122 of the RAM disk 113 and the second portion 126 of the data store 115 correspond to the second data received from the personalized VMs 144.

As described above, the VMs 140 include the pooled VMs 142 and the personalized VMs 144. Since operations of the pooled VMs 142 and the personalized VMs 144 are different in nature, the on-demand data write through operations for each of the first data and the second data are different. For example, each of the first data and the second data may include one or more of the IRPs. In order to increase the I/O throughput, all of these IRPs from the pooled VMs 142 are carefully examined. In certain embodiments, it is determined that certain IRPs from the pooled VMs 142 do not have to be preserved in the data store 115 of the non-volatile storage device 114 because losing these IRPs in case of a power failure will not substantially negatively impact the normal operation of the virtual desktop server 110, as well as the pooled VMs 142 being executed. On the other hand, certain IRPs, including the IRPs from the pooled VMs 142 and all of the IRPs from the personalized VMs 144, must be preserved in the data store 115 of the non-volatile storage device 114 to prevent information loss in case of a power failure. In such a manner, the write through cache operations are reduced to enable data write through cache only for these IRPs.

Based on the above structure of the virtual desktop server 110, the on-demand data write through operations may be provided as follows. When the personalized VMs 144 generate the second data (such as IRPs), the second data has to be persistent because each of the personalized VMs 144 is only assignable to a specific user and not shared by anyone else. Thus, data write through for the second data should be enabled. In this case, the second data is stored in the second partition 122 of the RAM disk 113 for fast access, and an identical copy of the second data is also written through to the second portion 126 of the data store 115 of the storage device 114. On the other hand, when the pooled VMs 142 generate the first data (such as IRPs), the first data is not necessarily persistent because the pooled VMs 142 may generate multiple shared copies or instances to be shared by a group of users, such that any one of the users in the group may access an instance of the pooled VM 142. Thus, the first data only needs to be stored in the first partition 120 of the RAM disk 113. In this case, data write through for the first data may be disabled, such that the first data is stored in the first partition 120 of the RAM disk 113 for fast access without being copied to the data store 115. In certain embodiments, when the first data is received from the pooled VMs 142, a determination may be performed as to whether the first data is related to the virtual machine management task. When the first data is determined to be unrelated to the virtual machine management task, the first data may not necessarily be persistent, and the data write through for the first data may be maintained disabled. Alternatively, when the first data is determined to be related to the virtual machine management task, the first data may be persistent. Thus, the first data needs to be stored in both the first partition 120 of the RAM disk 113 and the first portion 124 of the data store 115. In this case, data write through for the first data may be enabled, such that the first data is stored in the first partition 120 of the RAM disk 113 for fast access, and an identical copy of the first data is also written through to the first portion 124 of the data store 115 of the storage device 114.

The computer executable code 190 is the software code which, when executed at the processor 111, is configured to perform the on-demand data write through operations for the virtual desktop server 110. In certain embodiments, the computer executable code 190, when executed at the processor 111, may be configured to: allocate a portion of the memory 112 to create the RAM disk 113; partition the RAM disk 113 into the first partition 120 and the second partition 122; allocate a portion of the storage device 114 to create the data store 115, where the data store 115 includes the first portion 124 and the second portion 126; and perform a plurality of data write through operations based on VM types. In certain embodiments, the data write through operations may include: disabling data write through for the first data from the first partition 120 of the RAM disk 113 to the first portion 124 of the data store 115; and enabling the data write through for the second data from the second partition 122 of the RAM disk 113 to the second portion 126 of the data store 115. In certain embodiments, the data write through operation may further include: in response to receiving the first data from the first type VMs (i.e., instances of the pooled VMs 142), determining whether the first data is related to a virtual machine management task; and when the first data is related to the virtual machine management task, enabling the data write through for the first data from the first partition 120 of the RAM disk 113 to the first portion 124 of the data store 115. In certain embodiments, when the first data is unrelated to the virtual machine management task, disabling the data write through for the first data from the first partition 120 of the RAM disk 113 to the first portion 124 of the data store 115.

Figure 3:
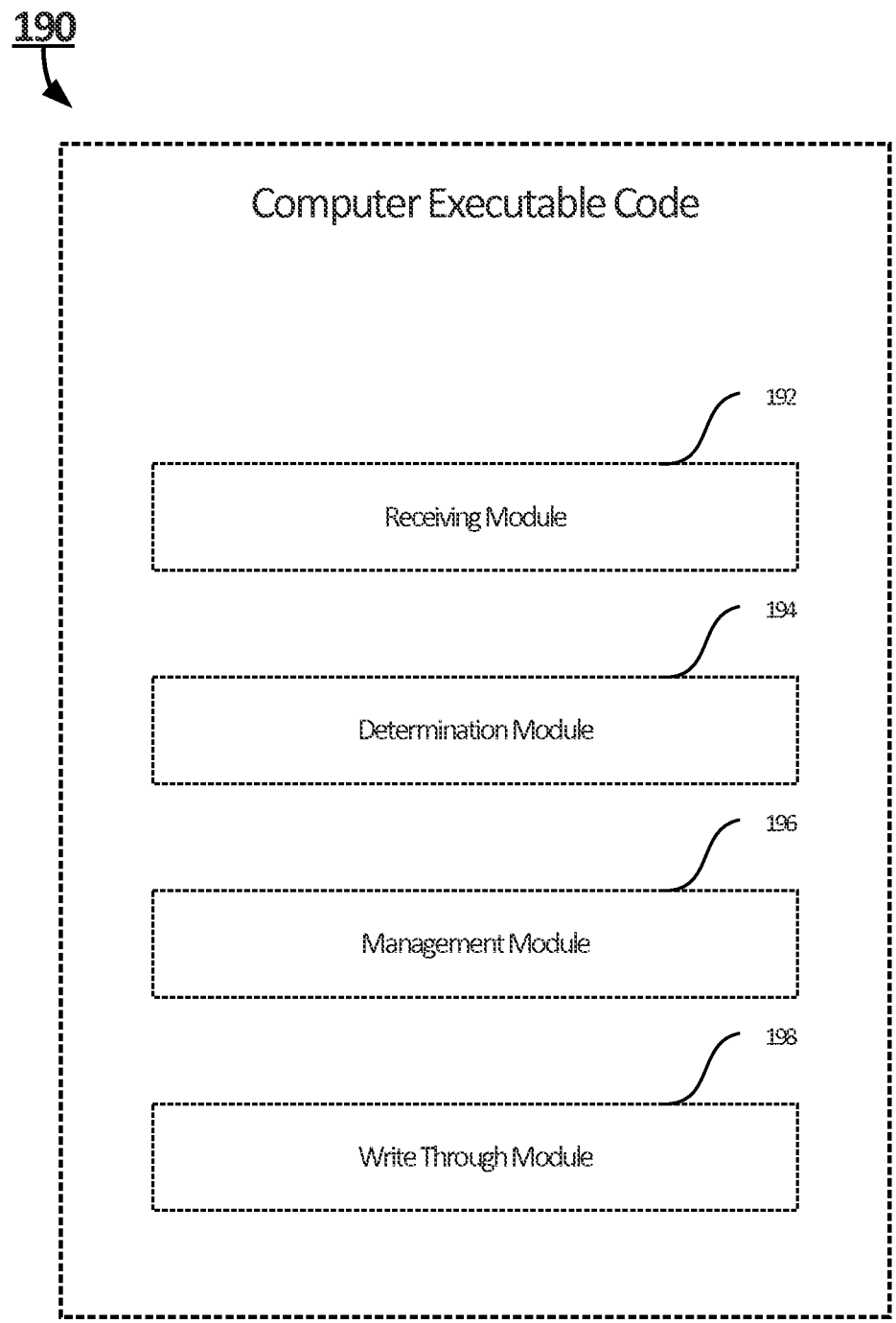
FIG. 3 schematically depicts a block diagram of computer executable code for performing on-demand data write through according to certain embodiments of the present disclosure.

FIG. 3 shows a block diagram of computer executable code for performing on-demand data write through according to certain embodiments of the present disclosure. As shown in FIG. 3, the computer executable code 190 includes a receiving module 192, a determination module 194, a management module 196, and a write through module 198. In certain embodiments, the computer executable code 190 may include other modules to perform other functions.

The receiving module 192 is configured to receive the data to be preserved from the VMs 140, where the data may be processed by the write through module 198. Since the VMs 140 include the pooled VMs 142 and the personalized VMs 144, the receiving module 192 is configured to receive the first data to be preserved from the instances of the pooled VMs 140, and to receive the second data to be preserved from the personalized VMs 140.

The determination module 194 is configured to determine a corresponding write through operation for each of the received data by the receiving module 192. In certain embodiments, the determination process performed by the determination module 194 may include: determining whether the received data is the first data from the first type VMs (i.e., the instances of the pooled VMs 142) or the second data from the second type VMs (i.e., the personalized VMs 144); and when the received data is the first data, determining whether the first data is related to the virtual machine management task.

The write through module 198 is configured to perform the data write through operations. In certain embodiments, the write through module 198 is configured to perform the data write through operations by: storing the first data in the first partition 120 of the RAM disk 113 when the data write through is disabled for the first data; storing the first data in the first partition 120 of the RAM disk 113 and in the first portion 124 of the data store 115 when the data write through is enabled for the first data; and storing the second data in the second partition 122 of the RAM disk 113 and in the second portion 126 of the data store 115.

The management module 196 is a software module configured to create the data store 115 in the storage device 114, to create the RAM disk 113 in the memory 112, to partition the RAM disk 113 into the two partitions, to partition the data store 115 into the two portions, and to control the write through module 198 to enable or disable the data write through for the received data based on determination of the determination module 192 for the received data. In certain embodiments, the management module 196 is configured to control the write through module 198 to enable or disable the data write through for the received data by: when the received data is the second data, controlling the write through module 198 to enable the data write through for the second data; when the received data is the first data and is related to the virtual machine management task, controlling the write through module 198 to enable the data write through for the first data related to the virtual machine management task; and when the received data is the first data and is unrelated to the virtual machine management task, controlling the write through module 198 to disable the data write through for the first data unrelated to the virtual machine management task.

Another aspect of the present disclosure relates to a computer implemented method of performing on-demand write through operations. In certain embodiments, the method may be implemented by the execution of computer executable code 190 at the processor 111 of the virtual desktop server 110 of the system 100, as shown in FIGS. 1-3.

Figure 4:
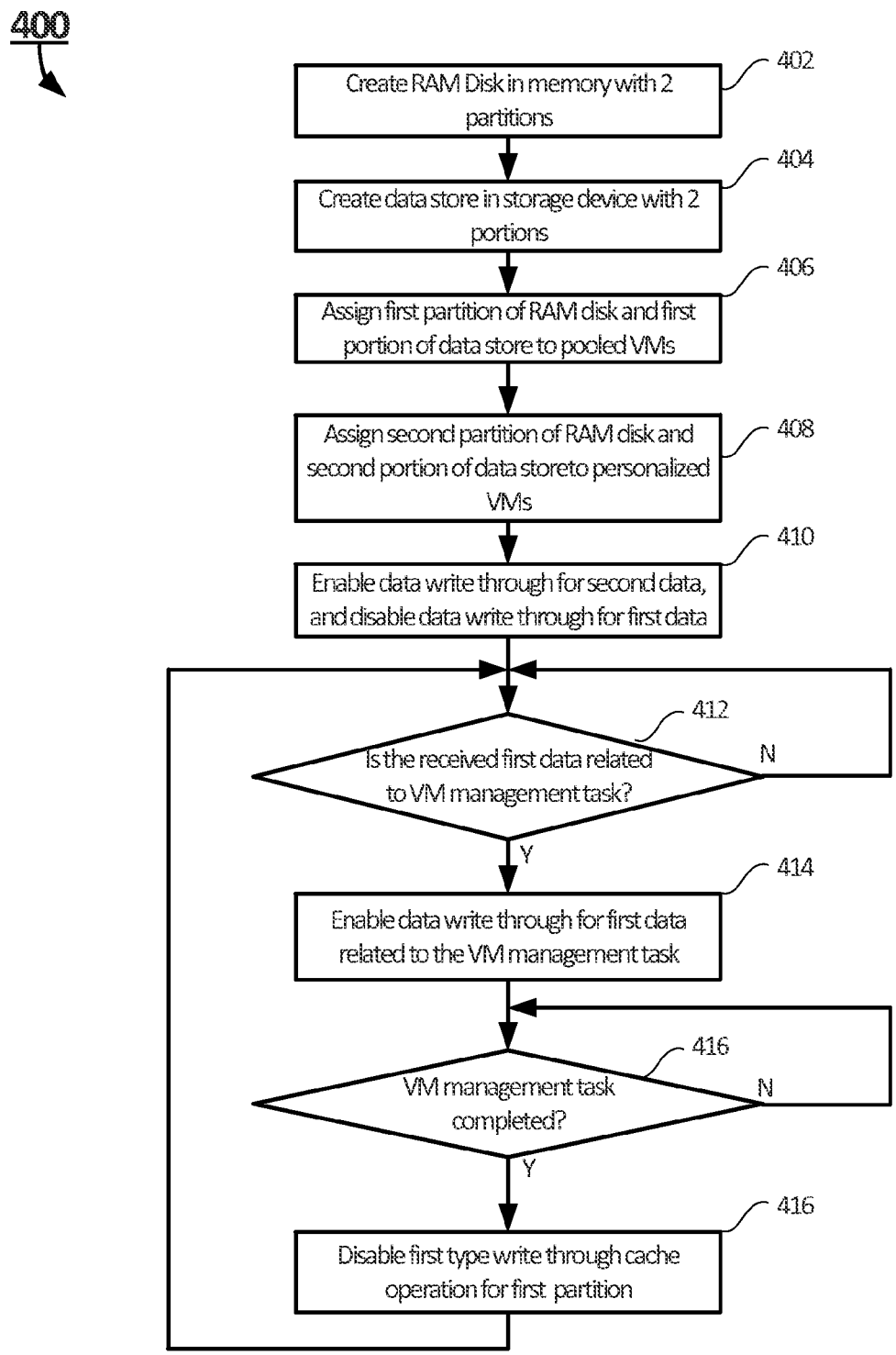
FIG. 4 shows a flowchart of a method for performing on-demand data write through according to certain embodiments of the present disclosure.

FIG. 4 shows a flowchart of a method for performing on-demand data write through according to certain embodiments of the present disclosure. As described above, the method may be implemented by the execution of the computer executable code 190 at the virtual desktop server 110. It should be noted that the method as shown in FIG. 4 merely represent certain embodiments of the present disclosure, and is not intended to be exhaustive or to limit the disclosure to the precise forms disclosed.

At procedure 402, after the start of an on-demand data write through process, the management module 196 of the computer executable code 190 allocates a portion of the memory 112 to create the RAM disk 113. Once the RAM disk 113 is created, the management module 196 partitions the RAM disk 113 into two partitions, including a first partition 120 and a second partition 122.

At procedure 404, the management module 196 allocates a portion of the storage device 114 to create the data store 115, which includes two portions, including a first portion 124 and a second portion 126. It should be noted that, although FIG. 4 shows that the data store 115 is created after the creation of the RAM disk 113, the creation of the data store 115 at procedure 404 may occur prior to or simultaneously with the creation of the RAM disk 113 at procedure 402.

At procedure 406, the management module 196 assigns the first partition 120 of the RAM disk 113 and the first portion 124 of the data store 115 to preserve first data (such as IRPs) from the pooled VMs 142.

At procedure 408, the management module 196 assigns the second partition 122 of the RAM disk 113 and the second portion 126 of the data store 115 to preserve second data (such as IRPs) from the personalized VMs 144.

At procedure 410, the computer executable code 190 sets predetermined write through operations for the first data and the second data. When the receiving module 192 receives the second data from the personalized VMs 144, the management module 196 may control the write through module 198 to enable data write through for the second data. It should be noted that data write through is always enabled for the second data received from the personalized VMs 144, regardless of whether the second data is related to the VM management task. On the other hand, when the receiving module 192 receives first data from the pooled VMs 142, the management module 196 is predetermined to control the write through module 198 to disable data write through for the first data. It should be noted that data write through may be enabled for the first data received from the pooled VMs 142 when the first data is related to the VM management task, which may be described later.

Once the setup of the management module 196 is complete, the receiving module 192 and the determination module 194 constantly monitor the incoming data from the VMs 140, which includes the pooled VMs 142 and the personalized VMs 144. Whenever the receiving module 192 receives a data, the determination module 194 determines whether the received data is the first data from the first type VMs (i.e. the pooled VMs 142) or the second data from the second type VMs (i.e., the personalized VMs 144).

At procedure 412, when the determination module 194 determines that the received data is the first data, the determination module 194 further determines whether the first data is related to the virtual machine management task. When the first data is unrelated to the virtual machine management task, the predetermined data write through operation (i.e., data writ through being disabled) is performed to the first data unrelated to the virtual machine management task, and the process loop back to procedure 412 to wait for more incoming data. In this case, the first data is only stored in the first partition 120 of the RAM disk 113, and will not be preserved in the first portion 124 of the data store 115. Thus, data traffic from the RAM disk 113 to the storage device 114 is reduced, and therefore, the throughput to the RAM disk 113 is increased.

On the other hand, when the determination module 194 determines that the first data is related to the virtual machine management task, at procedure 414, the management module 196 controls the write through module 198 to enable data write through for the first data. In certain embodiments, a snap VM manager (SVM) may be provided to perform the virtual machine management task. It should be noted that the virtual machine management task may be performed for a certain period of time. Thus, at procedure 416, the management module 196 may wait for the period of time such that the virtual machine management task may be completed. The process loops back to procedure 416 when the virtual machine management task is still in progress.

Once the virtual machine management task is completed, at procedure 418, the management module 196 controls the write through module 198 to return to the predetermined data write through status. In other words, the management module 196 controls the write through module 198 to disable data write through for the first data. Once the procedure 418 is completed, the process loops back to procedure 412 to wait for and process more incoming data.

Figure 5:
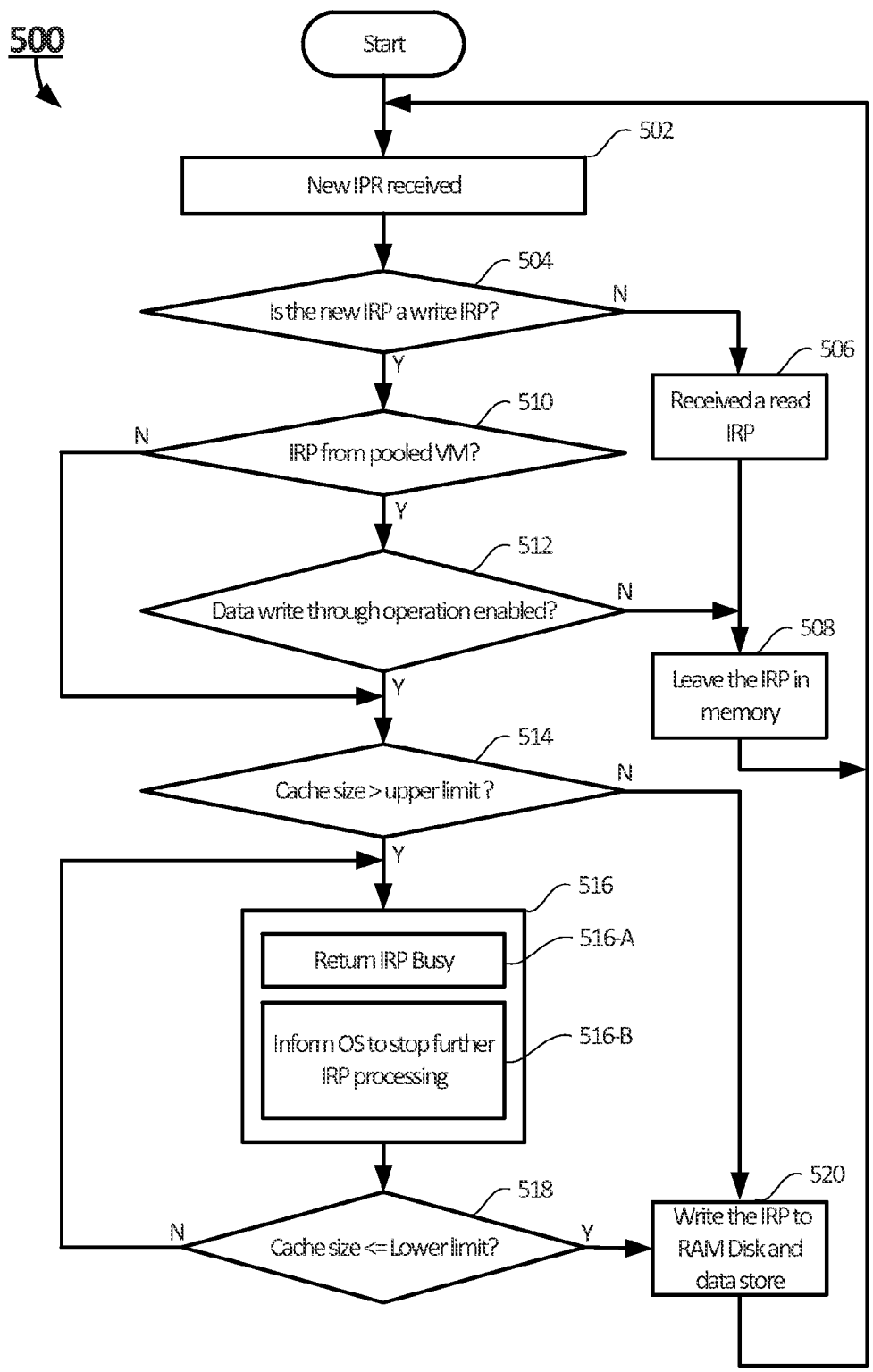
FIG. 5 shows a flowchart of a method for performing on-demand data write through for IRPs according to certain embodiments of the present disclosure.

FIG. 5 shows a flowchart of a method for performing on-demand data write through for IRPs according to certain embodiments of the present disclosure. As described above, the method may be implemented by the execution of the computer executable code 190 at the virtual desktop server 110. It should be noted that the method as shown in FIG. 5 merely represent certain embodiments of the present disclosure, and is not intended to be exhaustive or to limit the disclosure to the precise forms disclosed.

As described above, each of the first data and the second data may include one or more IRPs. In certain embodiments, each of the IRPs may be a read IRP, or a write IRP. The read IRP is a read request packet to read information stored in the RAM disk 113 of the memory 112. The write IRP is a write request packet to write information to the RAM disk 113 of the memory 112. Once the read IRPs are executed, i.e., the data is read from the memory 112, there is no need to store these read IRPs. However, when the write IRPs are executed, there is certain persistent information to be preserved in non-volatile storage device 114. Therefore, only write IRPs is to be preserved in the non-volatile storage device 114. Since the read IRPs are not to be preserved in the non-volatile storage device 114, this data write through operations may be further reduced for the read IRPs and increase the data write through throughput.

At procedure 502, a new IRP is received by the receiving module 192 of the computer executable code 190. The received IRP may be a read IRP or a write IRP. At procedure 504, the receiving module 192 checks the header of the IRP received, and determines whether the IRP received is a read IRP or a write IRP. When the IRP received is not a write IRP, the process continues to procedure 506. When the IRP received is a write IRP, the process continues to procedure 510.

At procedure 506, since the IRP is a not a write IRP, the receiving module 192 determines that the IRP received is a read IRP. The process continues to procedure 508 after the determination. At procedure 508, the read IRP is left in the memory 112 since there is no need to preserve the read IRP.

At procedure 510, since the IRP is a write IRP, the determination module 194 now determines whether the received IRP is from one of the instances of the pooled VMs 142, or from one of the personalized VMs 144. When the received IRP is from one of the instances of the pooled VMs 142, the process proceeds to procedure 512. When the received IRP is from one of the personalized VMs 144, the data write through will always be enabled, and the process skips procedure 512 and proceeds to procedure 514.

When the received IRP is from one of the instances of the pooled VMs 142 (i.e., the received IRP is the first data), at procedure 512, the management module 196 determines whether the data write through is enabled. When the data write through is enabled, the process moves forward to procedure 514 such that the management module 196 may control the write through module 198 to preserve or cache the IRP in the corresponding partition (in this case the first partition 120) of the RAM disk 113, and preserve the IRP cached in the corresponding partition (in this case the first partition 120) of the RAM disk 113 to the corresponding portion (in this case the first portion 124) of the data store 115. When the data write through is not enabled, the process continues to procedure 508 to cache the received IRP in the memory 112 (in this case the first partition 120 of the RAM disk 113) only. This received IRP will not be preserved in the first portion 124 of the data store 115. Once the received IRP is cached in the first partition 120 of the RAM disk 113, the process returns to procedure 502 to wait for more incoming IRPs.

When the received IRP is from one of the personalized VMs 144 (i.e., the received IRP is the second data), the process moves forward to procedure 514 such that the management module 196 may control the write through module 198 to preserve or cache the IRP in the corresponding partition (in this case the second partition 122) of the RAM disk 113, and preserve the IRP cached in the corresponding partition (in this case the second partition 122) of the RAM disk 113 to the corresponding portion (in this case the second portion 126) of the data store 115.

At procedure 514, the received IRP will be preserved in both the RAM disk 113 and the data store 115. In certain embodiments, the management module 196 checks whether the cache size exceeds an upper limit of the RAM disk 113. When the cache size exceeds the upper limit of the RAM disk 113, the process proceeds to procedure 516. When the cache size does not exceed the upper limit, the process proceeds to procedure 520 such that the management module 196 may control the write through module 198 to write the received IRP to the corresponding partition of the RAM disk 113 and the corresponding portion of the data store 115.

At procedure 516, when the cache size exceeds the upper limit of the RAM disk 113, the management module 196 returns an IRP busy message to the operating system 116 of the virtual desktop server 110 at sub-procedure 516-A, and informs the operating system to stop further processing until the data in the RAM disk 113 is written through to the data store 115, and the cache size is reduce to below the upper limit of the RAM disk 113 at sub-procedure 516-2.

At procedure 518, the management module 196 checks whether the current cache size is reduced to less than or equal to a lower limit of the RAM disk 113. When the current cache size is still greater than the lower limit of the RAM disk 113, the process loops back to procedure 516 and waits for further reduction of the cache size of the RAM disk 113. Alternatively, when the current cache size is reduced to less than or equal to a lower limit of the RAM disk 113, the process proceeds to procedure 520.

At procedure 520, when the cache size is below a certain limit of the RAM disk 113, the management module 196 may control the write through module 198 to write the received IRP to the corresponding partition of the RAM disk 113 and the corresponding portion of the data store 115. The process then returns to the procedure 502 to wait for more new IRPs.

In yet another aspect, the present disclosure relates to a non-transitory computer readable medium storing computer executable code. In certain embodiments, the computer executable code may be the computer executable code 190 as described above for performing on-demand write through operations. In certain embodiments, the non-transitory computer readable medium may include, but not limited to, the storage device 114 as described above, or any other storage media of the virtual desktop server 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a virtual desktop server, comprising:
a processor;
a memory; and
a storage device storing computer executable code, wherein the computer executable code, when executed at the processor, is configured to:
allocate a portion of the memory to create a random access memory (RAM) disk;
partition the RAM disk into a first partition and a second partition;
cache a first data received from a plurality of first type virtual machines (VMs) in the first partition;
cache a second data received from a plurality of second type VMs in the second partition,
wherein the first type VMs are pooled VMs and each of the pooled VMs generates multiple shared instances shared by a group of users, such that any one of the users in the group can access an instance of the pooled VMs, and the second type VMs are personalized VMs and each of the personalized VMs is assigned to a specific user and not shared by anyone else;
allocate a portion of the storage device to create a data store, wherein the data store comprises a first portion for preserving the first data received from the first type VMs, and a second portion for preserving the second data received from the second type VMs; and
perform a plurality of data write through operations based on VM types, the data write through operations comprising:
blocking data write through for the first data from the first partition of the RAM disk to the first portion of the data store;
determining whether the first data is related to a VM management task;
in response to determining the first data is related to the VM management task, performing data write through for the first data from the first partition of the RAM disk to the first portion of the data store until the VM management task is completed; and
performing data write through for the second data from the second partition of the RAM disk to the second portion of the data store, thereby performing an on-demand data write through operation based on virtual machine types.

2. The system of claim 1, wherein the storage device further stores a hypervisor and a persistent copy of each of the first type VMs and the second type VMs, wherein the virtual desktop server is configured to:
execute the hypervisor;
copy the first type VMs and the second type VMs from the corresponding persistent copy to the RAM disk; and
execute each of the first type VMs and the second type VMs at the RAM disk on the executed hypervisor,
wherein each of the executed first type and second type VMs is configured to provide one or more virtual desktops accessible for a plurality of computing devices functioning as a plurality of thin clients.

3. The system of claim 1, wherein each of the first data received from the first type VMs and the second data received from the second type VMs comprises one or more input/output (I/O) request packets (IRPs).

4. The system of claim 1, wherein the data write through operations further comprise:
when the first data is unrelated to the virtual machine management task, blocking the data write through for the first data from the first partition of the RAM disk to the first portion of the data store.

5. The system of claim 4, wherein the computer executable code comprises:
a receiving module configured to receive data from the first type VMs and the second type of VMs;
a determination module configured to determine a corresponding write through operation for each of the received data;

a write through module configured to perform the data write through operations for the received data; and
a management module configured to:
   create the data store,
   create the RAM disk,
   partition the RAM disk,
   partition the data store into the first portion and the second portion, and
   control the write through module to enable or disable the data write through for the received data based on determination of the determination module for the received data.

6. The system of claim 5, wherein the determination module is configured to determine the corresponding write through operation for each of the received data by:
   determining whether the received data is the first data from the first type VMs or the second data from the second type VMs; and
   when the received data is the first data, determining whether the first data is related to the virtual machine management task.

7. The system of claim 5, wherein the write through module is configured to perform the data write through operations by:
   storing the first data in the first partition of the RAM disk when the data write through is disabled for the first data;
   storing the first data in the first partition of the RAM disk and in the first portion of the data store when the data write through is enabled for the first data; and
   storing the second data in the second partition of the RAM disk and in the second portion of the data store.

8. The system of claim 5, wherein the management module is configured to control the write through module to enable or disable the data write through for the received data by:
   when the received data is the second data, controlling the write through module to enable the data write through for the second data;
   when the received data is the first data and is related to the virtual machine management task, controlling the write through module to enable the data write through for the first data related to the virtual machine management task; and
   when the received data is the first data and is unrelated to the virtual machine management task, controlling the write through module to disable the data write through for the first data unrelated to the virtual machine management task.

9. A method for performing on-demand data write through operations, comprising:
   allocating, at a virtual desktop server, a portion of the memory to create a random access memory (RAM) disk;
   partitioning, at the virtual desktop server, the RAM disk into a first partition and a second partition;
   caching a first data received from a plurality of first type virtual machines (VMs) in the first partition;
   caching a second data received from a plurality of second type VMs in the second partition,
   wherein the first type VMs are pooled VMs and each of the pooled VMs generates multiple shared instances shared by a group of users, such that any one of the users in the group can access an instance of the pooled VMs, and the second type VMs are personalized VMs and each of the personalized VMs is assigned to a specific user and not shared by anyone else;
   allocating, at the virtual desktop server, a portion of the storage device to create a data store, wherein the data store comprises a first portion for preserving the first data received from the first type VMs, and a second portion for preserving the second data received from the second type VMs; and
   performing, at the virtual desktop server, a plurality of data write through operations based on VM types, the data write through operation comprising:
      blocking data write through for the first data from the first partition of the RAM disk to the first portion of the data store;
      determining whether the first data is related to a VM management task;
      in response to determining the first data is related to the VM management task, performing data write through for the first data from the first partition of the RAM disk to the first portion of the data store until the VM management task is completed; and
      performing data write through for the second data from the second partition of the RAM disk to the second portion of the data store, thereby performing the on-demand data write through operations based on virtual machine types.

10. The method of claim 9, wherein each of the first data received from the first type VMs and the second data received from the second type VMs comprises one or more input/output (I/O) request packets (IRPs).

11. The method of claim 9, wherein the data write through operations are performed by:
   storing the first data in the first partition of the RAM disk when the data write through is blocked for the first data;
   storing the first data in the first partition of the RAM disk and in the first portion of the data store when the data write through is performed for the first data; and
   storing the second data in the second partition of the RAM disk and in the second portion of the data store.

12. A non-transitory computer readable medium storing computer executable code, wherein the computer executable code, when executed at a processor of a virtual desktop server, is configured to
   allocate a portion of a memory of the virtual desktop server to create a random access memory (RAM) disk;
   partition the RAM disk into a first partition and a second partition;
   caching a first data received from a plurality of first type virtual machines (VMs) in the first partition;
   caching a second data received from a plurality of second type VMs in the second partition,
   wherein the first type VMs are pooled VMs and each of the pooled VMs generates multiple shared instances shared by a group of users, such that any one of the users in the group can access an instance of the pooled VMs, and the second type VMs are personalized VMs and each of the personalized VMs is assigned to a specific user and not shared by anyone else;
   allocate a portion of a storage device of the virtual desktop server to create a data store, wherein the data store comprises a first portion for preserving the first data received from the first type VMs, and a second portion for preserving the second data received from the second type VMs; and
   perform a plurality of data write through operations based on VM types, the data write through operations comprising:

blocking data write through for the first data from the first partition of the RAM disk to the first portion of the data store;

determining whether the first data is related to a VM management task;

in response to determining the first data is related to the VM management task, performing data write through for the first data from the first partition of the RAM disk to the first portion of the data store until the VM management task is completed; and performing data write through for the second data from the second partition of the RAM disk to the second portion of the data store, thereby performing an on-demand data write through based on virtual machine types.

13. The non-transitory computer readable medium of claim 12, wherein each of the first data received from the first type VMs and the second data received from the second type VMs comprises one or more input/output (I/O) request packets (IRPs).

14. The non-transitory computer readable medium of claim 12, wherein the computer executable code comprises:
   a receiving module configured to receive data from the first type VMs and the second type of VMs;
   a determination module configured to determine a corresponding write through operation for each of the received data;
   a write through module configured to perform the data write through operations for the received data; and
   a management module configured to:
      create the data store,
      create the RAM disk,
      partition the RAM disk,
      partition the data store into the first portion and the second portion, and
      control the write through module to enable or disable the data write through for the received data based on determination of the determination module for the received data.

15. The non-transitory computer readable medium of claim 14, wherein the determination module is configured to determine the corresponding write through operation for each of the received data by:
   determining whether the received data is the first data from the first type VMs or the second data from the second type VMs; and
   when the received data is the first data, determining whether the first data is related to the virtual machine management task.

16. The non-transitory computer readable medium of claim 14, wherein the write through module is configured to perform the data write through operations by:
   storing the first data in the first partition of the RAM disk when the data write through is disabled for the first data;
   storing the first data in the first partition of the RAM disk and in the first portion of the data store when the data write through is enabled for the first data; and
   storing the second data in the second partition of the RAM disk and in the second portion of the data store.

17. The non-transitory computer readable medium of claim 14, wherein the management module is configured to control the write through module to enable or disable the data write through for the received data by:
   when the received data is the second data, controlling the write through module to enable the data write through for the second data;
   when the received data is the first data and is related to the virtual machine management task, controlling the write through module to enable the data write through for the first data related to the virtual machine management task; and
   when the received data is the first data and is unrelated to the virtual machine management task, controlling the write through module to disable the data write through for the first data unrelated to the virtual machine management task.

* * * * *